INVENTOR.
Walter W Conners

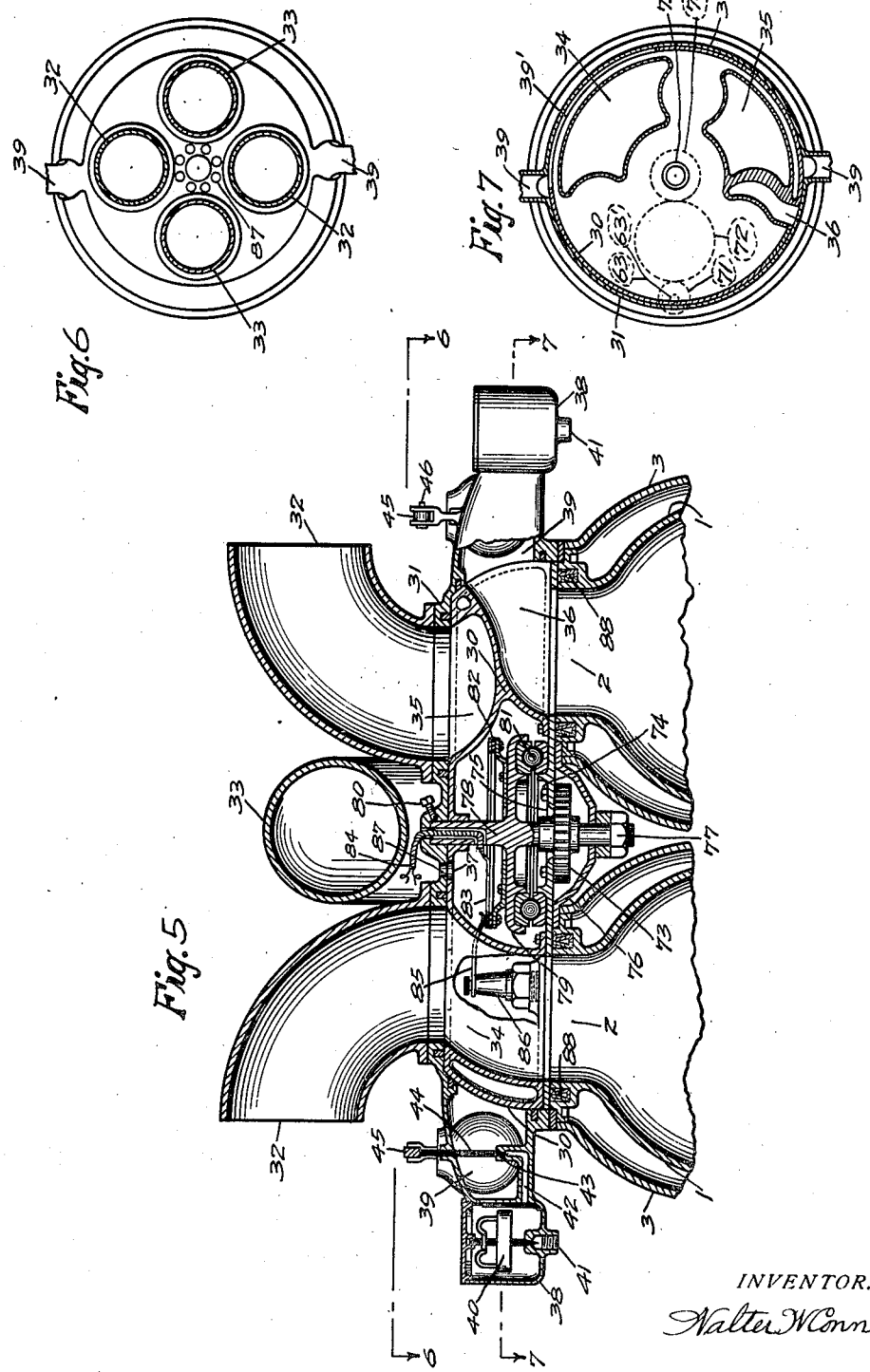

W. W. CONNERS.
INTERNAL COMBUSTION ENGINE.
APPLICATION FILED MAR. 19, 1919.
1,436,434.
Patented Nov. 21, 1922.
8 SHEETS—SHEET 6.
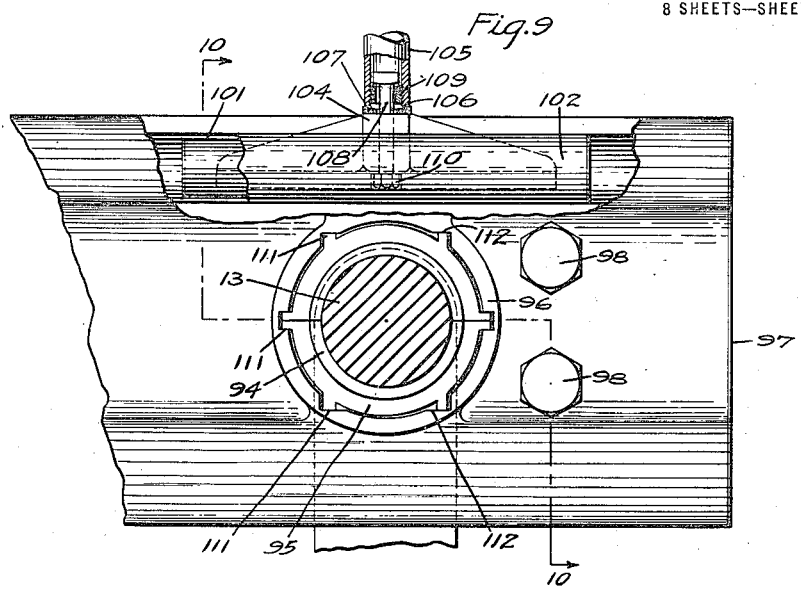
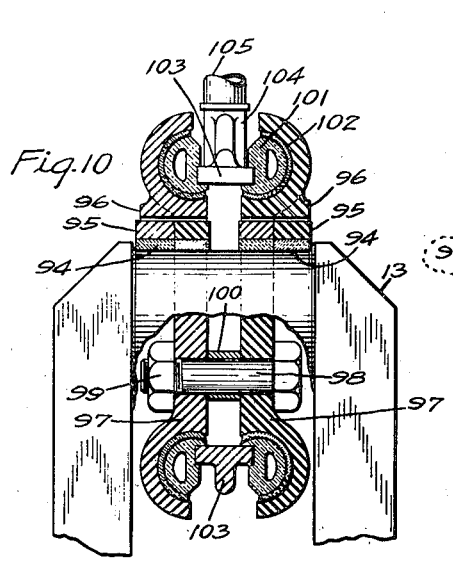
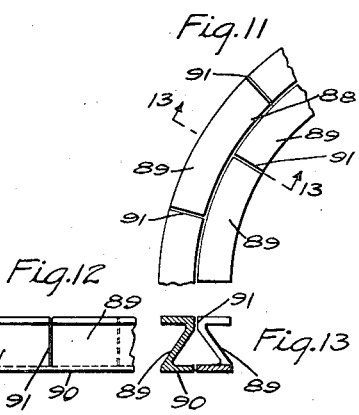
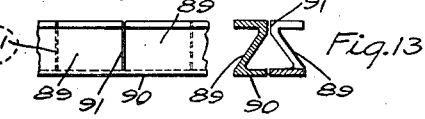
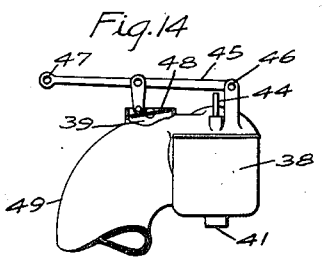
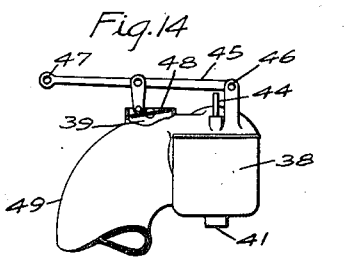
INVENTOR
Walter W Conners W. W. CONNERS.
INTERNAL COMBUSTION ENGINE.
APPLICATION FILED MAR. 19, 1919.
1,436,434.
Patented Nov. 21, 1922.
8 SHEETS—SHEET 7.
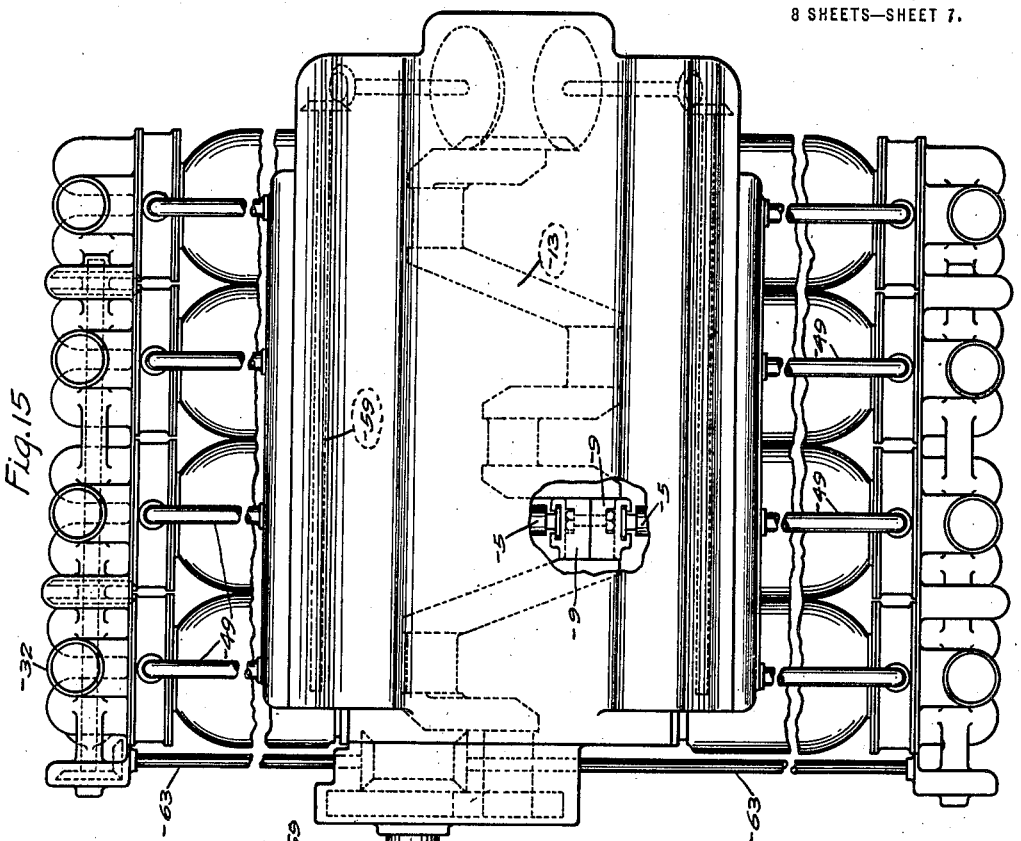
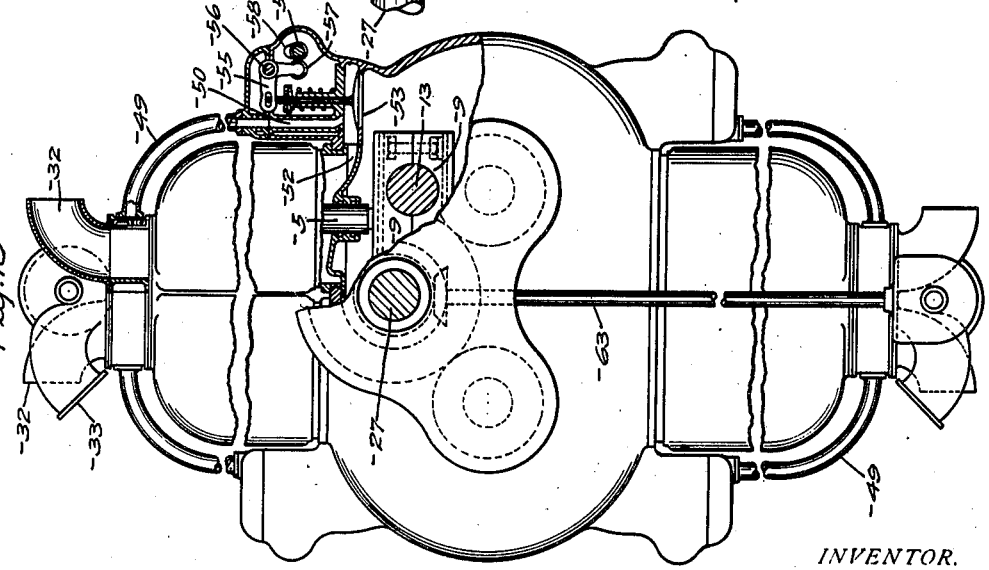
INVENTOR.
Walter W Conners

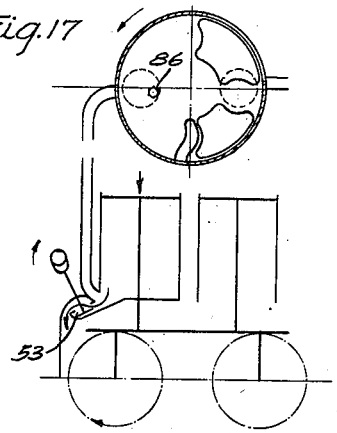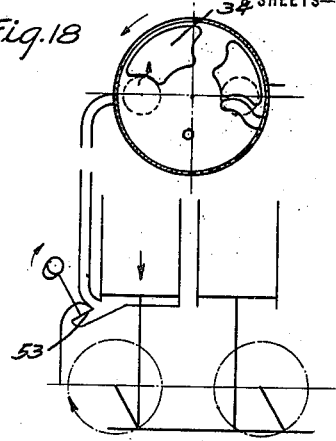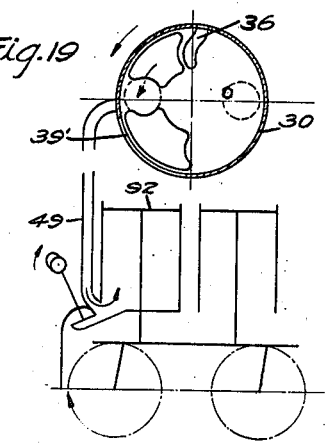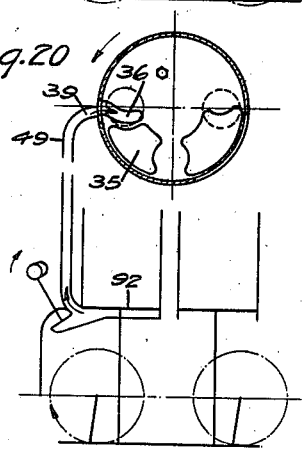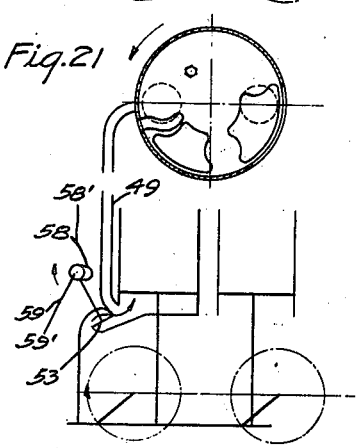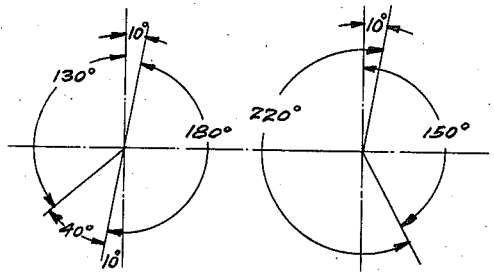

Patented Nov. 21, 1922.

1,436,434

UNITED STATES PATENT OFFICE.

WALTER W. CONNERS, OF ELIZABETH, NEW JERSEY.

INTERNAL-COMBUSTION ENGINE.

Application filed March 19, 1919. Serial No. 283,640.

*To all whom it may concern:*

Be it known that I, WALTER W. CONNERS, citizen of the United States, and resident of Elizabeth, in the county of Union and State of New Jersey, have invented certain new and useful Improvements in Internal-Combustion Engines, of which the following is a specification.

This invention relates to improvements in gas engines of the internal combustion type in which certain novel features are involved which tend toward maximum mechanical and thermal efficiency, reliability, economic cost of production and desirableness.

One of the objects of this invention is to provide an engine in which the piston actuating means have reciprocatory, without oscillatory, motion.

A second object of this invention is to provide an engine as described in which balanced harmonic action of the reciprocating parts will result from the particular arrangement hereinafter disclosed, thereby reducing vibration and increasing the mechanical and thermal efficiency.

A third object of this invention is to provide an engine of the character described in which the reciprocating parts are formed of a minimum weight of material thereby reducing the inertia, friction and wear and the consequent strains and stresses, allowing higher speed; thus decreasing heat absorption by the parts and increasing the thermal efficiency of the engine.

A fourth object is to provide an internal combustion engine in which the piston walls are released of all mechanical lateral strain.

A fifth object is to provide an engine as described, of such construction and arrangement as will allow of simple and efficient lubrication of all the parts, producing maximum lubrication with minimum consumption of lubricant.

A sixth object is to provide, in an engine as described, a means whereby a super charge of combustion fluid or air is inducted into the combustion chambers to increase or mix with the usual charge ordinarily inducted, thus increasing the explosive force and producing thereby greater efficiency and flexibility, particularly when the engine is operating under rarefied atmospheric conditions, or under variable loads.

A seventh object is the particular means hereinafter disclosed for lubricating the piston through the medium of a lubricant charged air drawn from the crank case during a predetermined stroke of the piston, as will be hereinafter fully disclosed.

An eighth object is to provide an engine of the character described in which the various members are so constructed and arranged and so function that the cylinders and pistons may readily be located, with respect to the crank shaft, at any angle desired for any particular purpose.

A ninth object is to provide an internal combustion engine in which the duration of time of ignition action of the spark on the combustible elements, is materially diminished over the usual time whereby life and efficiency are greater and in which there is provided a means or system of ignition whereby a single ignition unit is adapted to serve a plurality of explosive or combustion chambers.

A tenth object is to provide an engine embodying the various features mentioned in which the operative members are so disposed, with respect to one another, that the vibrations due from the action of the explosives are resolved into a circular motion consistent with the rotation of the shaft.

An eleventh object of this invention is to provide an engine in which various fundamental bearing surfaces are so constructed and disposed that they may be efficiently lubricated and cooled.

A twelfth object is to provide an engine in which there is provided a means or system whereby a single unit of parts and valves is adapted to serve a plurality of cylinders.

A thirteenth object is to provide an engine in which the reciprocating and rotating parts are so constructed and disposed that perfect mechanical and pressure balance results.

A fourteenth object is to provide an engine in which the piston and piston rods are free from all mechanical lateral strain.

A fifteenth object is to provide an engine of the character described in which the non-explosive side of the piston is adapted to increase its power, whereby reliability and mechanical and thermal efficiency are increased.

A sixteenth object is to provide a valve system or means for controlling air and combustion elements which would consume minimum of driving power and be reliable, positive and efficient in action, self alining and adjusting.

A seventeenth object is to provide means for establishing and controlling communication from one side of piston to opposite side.

An eighteenth object is to provide means whereby the function of the auxiliary supercharge air and combustion elements and their controlling means are independent of the usual functions of an engine.

A nineteenth object is to provide means for oiling cylinder and piston independently of other parts.

The twentieth object is to provide an engine whereby the supercharge air and combustion elements may be used to further increase the usual range of power and flexibility.

A further object is to provide an engine of the character described, embodying the various features mentioned, and of such simple and durable construction as will tend towards minimum wear and longevity of the parts.

Another object is to provide an engine of the character described in which the aforesaid reciprocating parts, passages, ports and other rotating or moving members are so arranged as to admit of the embodiment of a maximum of anti-friction bearing members thereby reducing the friction of the said moving members to a minimum, increasing life and reliability.

A further object is to provide an engine of the character described in which certain air cooling elements are provided in addition to the water jacket ordinarily provided.

A further object is to provide an internal combustion engine embodying parts, so designed that they are readily interchanged with one another, thereby producing an engine comprising a small variety of parts with obvious advantages.

How these objects as well as others hereinafter disclosed are attained will be explained in the following description taken in connection with the accompanying drawings, which form a part of these specifications and in which—

Figure 5 is an enlarged vertical section of the portion through the valve-drum and upper cylinder head taken on line 5—5 of Figure 4 and looking in the direction indicated;

Figure 6 is a plan, in section, taken on line 6—6 of Figure 5;

Figure 7 is a plan, in section, through the valve-drum and part of the casing taken on line 7—7 of Figure 5;

Figure 9 is a side elevation partly broken away of a modified form of bearing and crank connection with sliding beam;

Figure 10 is a section through same taken approximately on line 10—10 of Figure 9 in the direction indicated by arrows and showing a portion of the crank and its relative position therewith;

Figure 11 is a plan view of a portion of a spring compression packing ring hereinafter more fully described;

Figure 12 is an elevation, in part, of same;

Figure 13 is a section of same taken on line 13—13 of Figure 11, looking in the direction indicated by the arrows shown;

Figure 14 is a view, partly in section, of a carburetter employed as a mixing means for the superinduced charge of combustion fluid, hereinafter more fully described.

Figure 15 is an elevation of a sixteen cylinder engine embodying the principles of this invention.

Figure 16 is an end view of same partly in section.

Figures 17, 18, 19, 20 and 21 are diagrammatical views showing relative positions of the valves, passages and pistons during the various cycles of operation, and show the operation of the valve controlling the superinduced charge of combustion fluid;

Figures 22 and 23 are diagrammatical views illustrating the cycles of operation and hereinafter more fully described.

Figure 1:
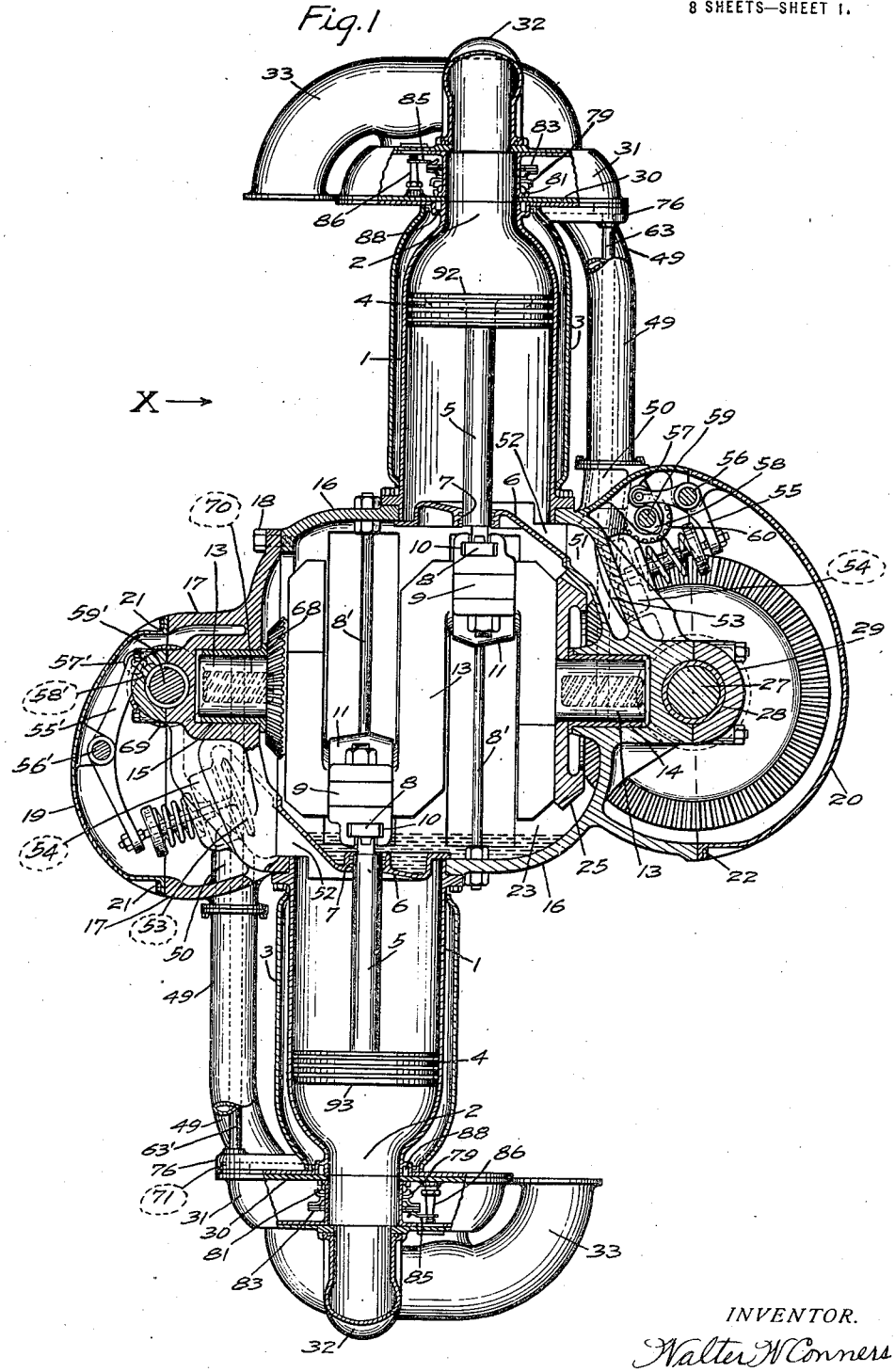
Figure 1 is a vertical sectional view taken approximately on the line 1—1 of Figures 2, 3 and 4 and looking in the direction indicated by the arrows shown.

The drawings disclose an engine of the four-cycle type and the description will be applied to that particular type, but it will be obvious, as the invention is disclosed, that same is not limited thereto.

Further it has been elected to show and describe a four-cylinder engine but it will be noted from the description that with slight detail modifications any number of cylinders or single cylinder may be employed.

Various details essential to the operation of the engine but not necessarily forming a part of this invention are not shown but such omissions are noted hereinafter.

Throughout the drawings similar parts are designated by similar reference numerals, except as may be otherwise noted.

Referring now to the parts in detail, (1) designates the cylinders whose outer ends (2) are contracted to form the inlet and outlet passages as will be hereinafter fully described. (3) designates the water jackets which are of any approved type or form of construction. (4) designates the pistons having the piston rods (5) rigidly attached thereto and operating through the cylinder heads (6). Any approved form packing (7) being provided to ensure a tight contact through the heads (6).

Figure 2:
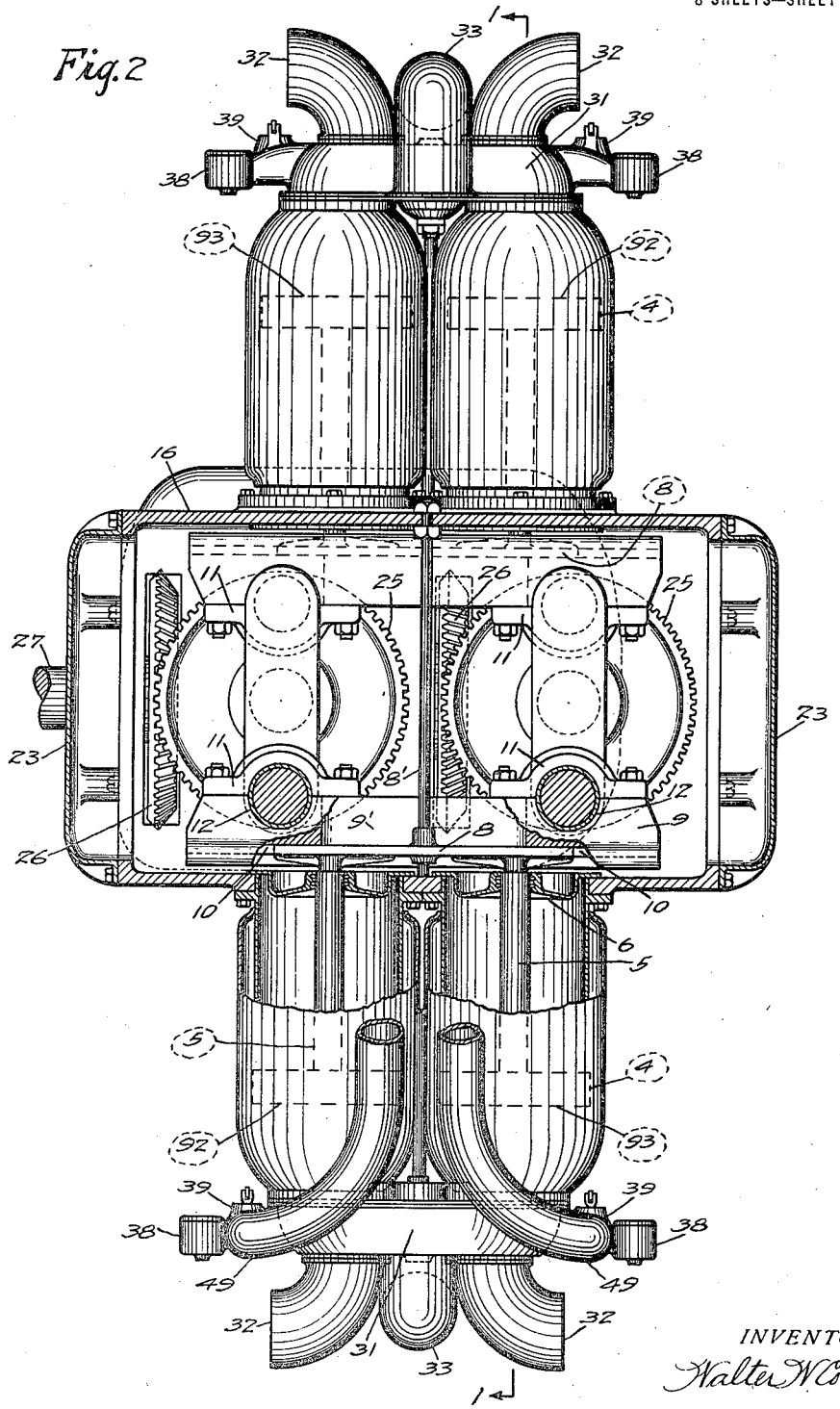
Figure 2 is an elevation, taken at right angles to the view shown in Figure 1, looking in the direction indicated by the arrow $x$ in Figure 1 and showing a portion of the casing removed, thereby better illustrating the crank shaft and piston connections.

The piston rods (5) terminate in the cross bars or beams (8) which in turn engage the crank beams (9). The said crank beams (9) are provided with the groove formations (10) which are adapted to engage the aforesaid beams (8) and permit same to slide thereon. The crank beams (9) are further provided with slot formations (9¹) (Figure 2) through which guide rods (8¹) engage. The said guide rods (8¹) are secured in suitable manner, to the casing and engage through the cross bars (8) to act as guides for said cross bars (8) and take up the lateral thrust.

Attached to the said crank beam (9) and held thereon by means of the bearing caps (11) are bearings (12) (Figure 2) which engage the crank formations on the crank shafts (13) and the said crank shafts (13) engage within the bearings (14) and (15). The bearings (14) are formed upon the main casing or housing (16) to which the aforesaid cylinders (1) are securely attached while the bearings (13) are formed upon the casing member (17) which is secured to the casing (16) by means of screws (18).

Covering members (19) and (20) are provided and are attached to the casing member (17) by means of the screws (21) and to the casing by means of the screws (22). End closing members (23) are attached to the casing (16) by means of the screws (24).

Attached to the crank-shafts (13) and adapted to rotate with them are beveled gears (25) which in turn engage to drive the bevel gears (26) which are attached to a driving shaft (27). The said driving shaft (27) is mounted upon the casing (16), rotates within the bearings (28) and is held therein by the bearing caps (29).

Valve members (30) hereinafter termed the valve-drums are rotatably mounted in close juxtaposition to the contracted ends or necks (2) of the cylinders (1) and are held in place thereon by means of the shells or housings (31) which are in turn suitably secured to the cylinders. The said housings (31) are provided with the exhausts or outlets (32) and fuel inlets (33) which are suitably attached to the valve housings (31) as shown.

Each valve-drum (30) is formed with an exhaust passage and port (34) (Figure 7), an inlet passage and port (35), and auxiliary passage and port (36) for directing the flow of a superinduced charge of combustion fluid and auxiliary air inlets (37) the function and operation of each of which will be further on more fully explained.

Extending laterally from and forming a part of the housings (31) and positioned preferably diametrically opposite one another are carburetters (38) and mixing chambers (39) (Figures 5 and 14). Each of the said carburetters (38) are provided with the usual float valve (40), fuel inlet (41) and outlet (42) which terminates in the needle valve (43). The said needle valve (43) is regulated by means of the needle (44) in conjunction with the lever (45) fulcrumed at (46) and operated through any suitable means or by hand, from the end (47). A butterfly valve (48) of the regulation type is suitably connected to the lever (45) and operates for the purpose hereinafter described.

Extending from each of the mixing chambers (39) and forming a part thereof are the conveyor pipes (49) which terminate at and connect with the conducting passages (50) formed in the casing (16) which passages (50) in turn, connect with the packets (51) formed upon the said crank casing (16) and extending through portion of same to the openings or passages (52) in the cylinder heads (6) thereby establishing normal communication between the ends of the cylinders adjacent the crank casing and the aforesaid mixing chambers (39). At predetermined intervals, during the operation of the parts, however, communication between the outer or head ends of the cylinders (6) and the crank shaft compartment of the casing is established through the valves (53) and valve chambers (54). The object of this communication will be fully disclosed in the description of the operation following hereinafter.

Figure 3:
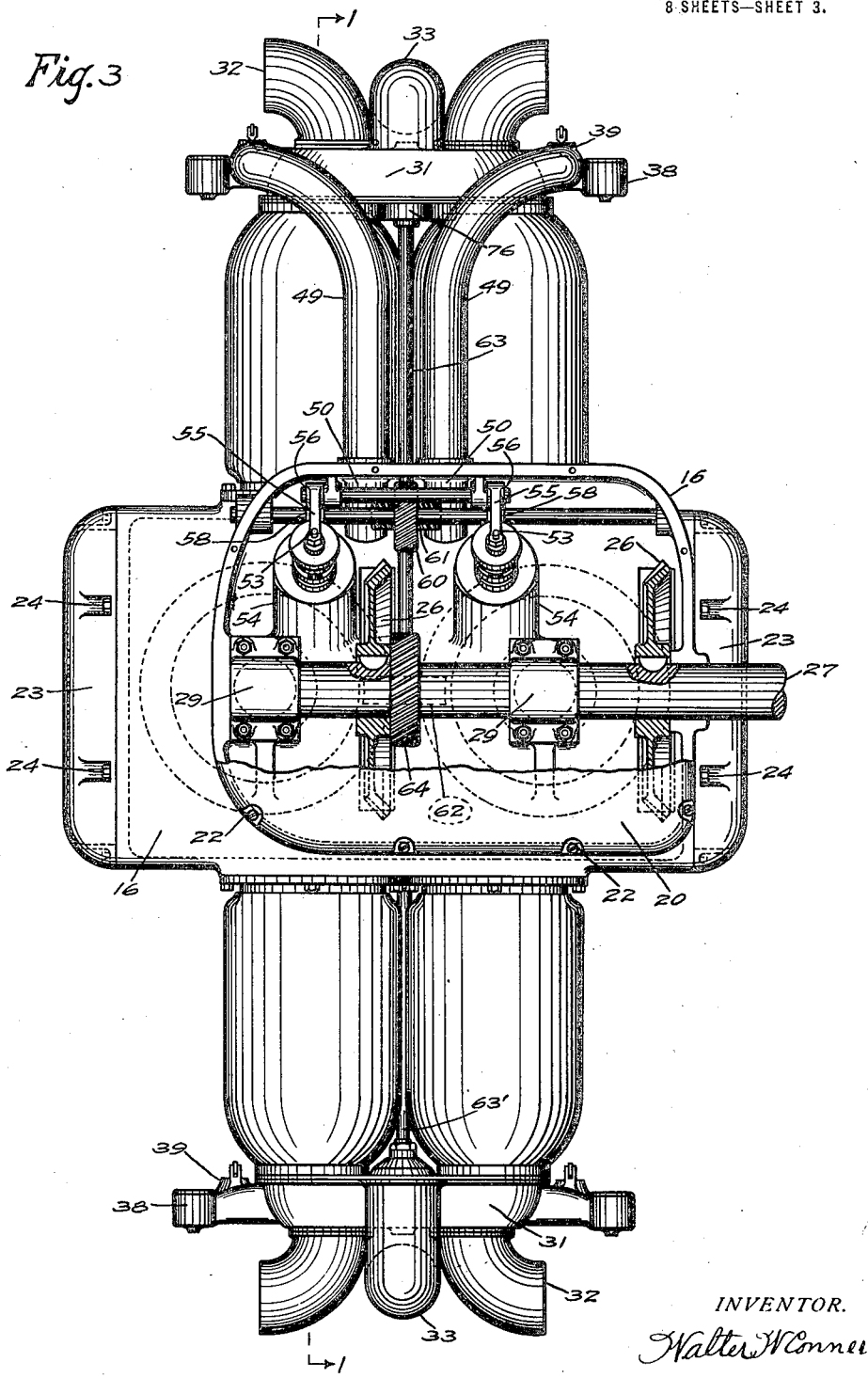
Figure 3 is an elevation of the side opposite that shown in Figure 2 and shown a part of the casing removed to better illustrate the driving shaft, valves and connections.

The said valves (53) are operated at the proper intervals, on one side, by means of the rocker arms (55) pivotally mounted at (56) and provided with roller contacts (57) which are adapted to contact with the cam members (58) in turn rigidly mounted upon the cam shaft (59). The said cam shaft (59) is revolved through the medium of the gear (60) mounted on said cam shaft, and the gears (61 and 62) (Figures 3 and 4) mounted upon a shaft (63) (whose additional function will hereinafter be explained) and the gear (64) mounted upon the aforesaid driving shaft (27).

Figure 4:
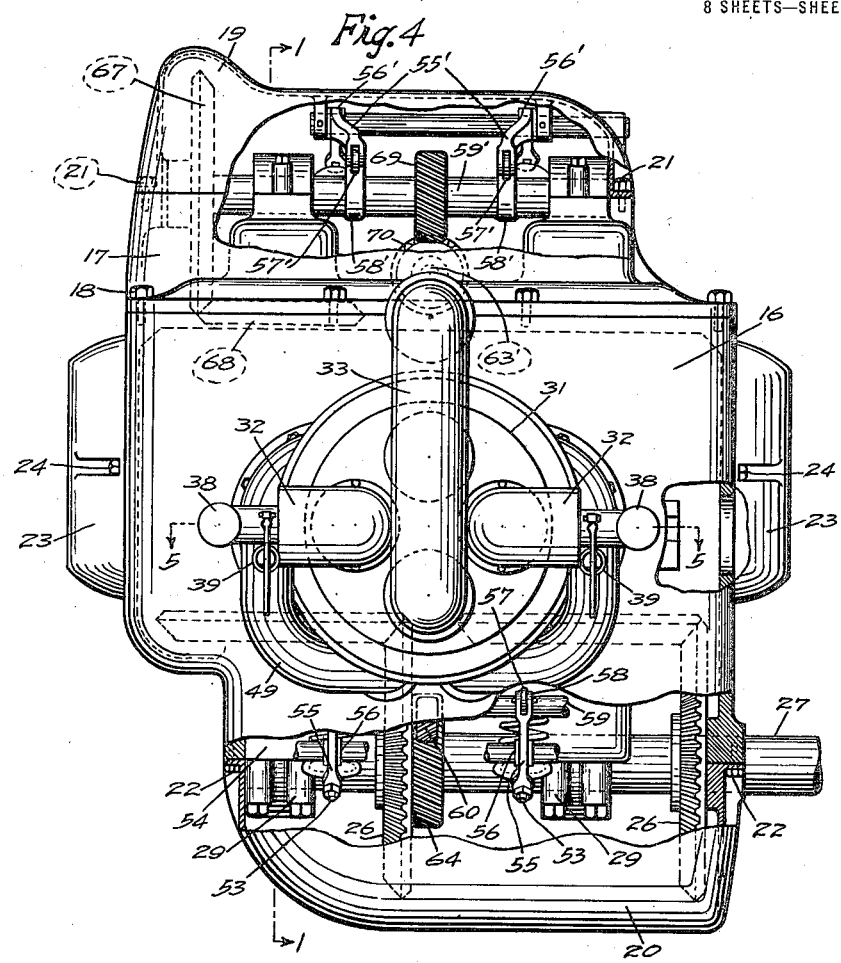
Figure 4 is a plan view having parts of the casing broken away to better illustrate the valves, cams and connections hereinafter fully described.

On the opposite side a similar operation takes place with similar parts but with the difference that the said parts while functioning in the same manner, are of slightly different shape and with respect to their relative positions, a little differently arranged. In view of this difference, the corresponding parts are given a similar reference numeral with the prime added up to and including (59) (Figures 1 and 4). The cam shaft (59¹) is driven by means of a gear (67) secured thereon (Figure 4) and in turn rotated by means of the gear (68) mounted upon one of the aforesaid crank shafts (13) (Figures 1 and 4).

A gear (69) is mounted upon the said cam shaft (59¹) and engages a gear (70) to rotate a shaft (63¹) whose function is similar to that of shaft (63) which function will presently be described.

The valve-drums (30) heretofore mentioned, are given their necessary rotary motion by means of the said shafts (63) and (63¹) operating in conjunction with gears (71) thereon (Figure 7), idlers (72) and gears (73) secured to the said valve-drums (30) by means of screws (74) (Figure 5). One end of the hub of the said gears (73) extends through an opening (75) in the said valve-drums (30). The said gears (71, 72, and 73) are enclosed and held by cover plates (76) which are attached to the cylinder heads in any approved manner, and the said cover plates (76) are provided with suitable bearings, not shown, for the idler (72).

Attached to the said cover plates (76), by means of nuts (77) are spindles (78) (Figure 5) which are provided or formed with annularly projecting ledges or shelves (79) and which are fastened, at their outer ends, to the aforesaid housings (31) by means of set screws (80); the said spindles (78) are thereby held against rotation with the valve-drum (30) but form a contact with the base plate of the said valve-drum (30) through the medium of the anti-friction bearings (81).

Fastened to the upper side of the said ledges (79) formed upon the said spindles (78) and securely held thereon by any suitable means are rings (82) of any suitable electric insulating material upon which, in turn are secured electric contact rings or members (83) which are adapted to engage the brushes (85) during the rotation of the valve-drums (30) and the attached said electric contact members (83).

The said electric contact members (83) or commutator rings, as they might obviously be termed, are fed by means of electric conductors (84) which pass through the hollow portion at the outer end of the said spindles (78) and which supplies current, at predetermined intervals, from any suitable source, not shown.

The intermittent current from the commutators (83) is taken up by the brushes or contact arms (85) which are attached to and supply electric fluid to the spark plugs (86) located within and turning with the valve-drums (30).

It will be noted that a portion of the wall of the exhaust chambers of the valve-drum (30) (Figure 5) is broken away to better disclose the spark plug (86).

The openings (37) in the said valve-drum (30), heretofore mentioned, coincide, at regular intervals, with openings (87) in each of the aforesaid valve-drum housings (31).

The combustion fluid inlets (33) shown, are provided, in the regular manner, with any approved form of carburetters, mixing chambers and source of supply and the exhausts (32) shown on the drawings are connected in the regular way to any suitable muffler or other means of conducting exhaust. But as these various units do not form a part of the invention herewith disclosed, they are not shown.

To insure a maximum tight joint between the valve-drum (30) and cylinder ends (2) with a minimum amount of friction to the rubbing parts, there is provided a specially formed and constructed spring packing ring (88), (Figures 5, 11, 12 and 13). The said ring (88) is formed by the annular segmental members (89) whose cross section is the double Z formation clearly shown in Figure 13. The said segments, (89) are integrally held together by means of a base member 90 and are formed by means of radial cuts (91) arranged in staggered formation around the ring.

Suitable packing rings are provided throughout wherever it is necessary to assure a tight joint but the above mentioned packing ring (88) is particularly desirable for use at the point stated.

Referring again to the valve-drum (30) (Figures 7 and 8) it will be noted that at predetermined periods during the revolution of the said drum, the opening leading to the mixing chamber (39), coincides with the auxiliary port and passage (36) and at another interval, with the port (39¹) formed in the periphery of the said valve-drum (30) and which communicates with the inner compartment of the valve-drum.

Figure 8:
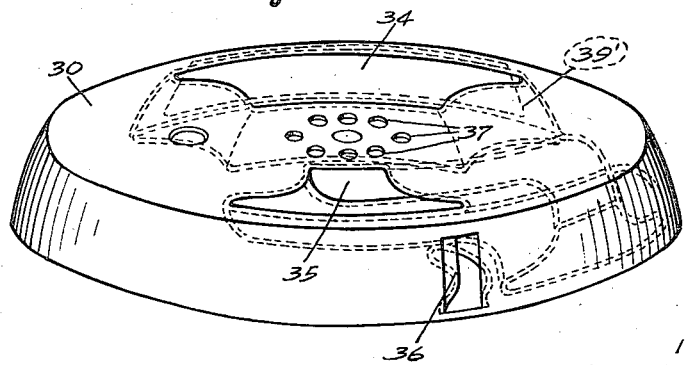
Figure 8 is an enlarged perspective view of the main valve-drum showing the intake and exhaust passages formed therein.

The exhaust compartment (34) of the valve-drum (30) is positioned approximately one quadrant along the periphery of the drum and extends vertically through the drum as clearly shown in Figures 7 and 8, while the intake compartment (35) is formed with one opening along the upper side of the drum (30) and extends part way along the periphery over the auxiliary passage (36) and down to its opening in the base of the drum as shown in Figure 8. The auxiliary passage (36) extends from the peripheral opening shown, to the opening in the base of the drum as clearly shown in Figures 7 and 8.

Having now fully described the construction of the engine, its various parts and their correlation as to placement this description will continue with an explanation of the correlative operation of the parts.

Gas or combustion fluid is drawn in by suction against head surfaces (92) of piston (4) (Figures 1 and 2); the relative position of the inlet chamber (35) in valve-drum (30) being as shown in diagram (Figure 19) at the beginning of the intake stroke; (the pistons in the cylinders diagonally opposite each other, operating in unison). Assuming now, that the pistons have completed their intake stroke as indicated in diagram (Figure 20) it will be noted that the superinduced charge from the mixing chamber (39) hereinbefore mentioned and described, is entering the combustion chamber of the cylinder through the valve chamber (36), immediately following the induction of the regular charge.

As the return stroke develops the combustion chamber closes and compression begins and continues to the end of the said return stroke when compression is complete. Ignition through the spark plug (86) takes place, shortly before the completion of compression, and combustion continues during about 150° of the revolution of the crank shaft beyond the dead-center line. The resultant combustion drives the piston again in the direction of the first mentioned movement to drive the crank-shaft (13).

It will be noted here, that as the said return or compression develops the aforesaid valves (53), operated by means of the cams 58 and 58¹ and their cam shafts 59 and 59¹ (Figure 20) open to allow the piston to draw the oil-saturated air from the crank case into the cylinder at the crank-casing end to lubricate their walls and thereby in turn lubricate the pistons and piston rods and as the combustion stroke following takes place the said air is returned to the crank-case or other-wise through the said valve (53) which closes at the completion of the said combustion stroke (Figures 17 and 18).

(It will also be noted at this point that the piston heads (93) operating in the cylinders adjacent to the two cylinders above described operate in their turn in a similar manner and order, and by means of the same valve and ignition units as those employed in the cylinders just described with the difference that the pistons in the two sets of cylinders function alternately, that is, when combustion charges are being exploded against the piston heads (92) the piston heads (93) are inducting explosive charges into their chambers and vice versa).

The continuation of the movement, after the combustion stroke above mentioned, brings the exhaust compartment (34) of the valve-drum (30) into alignment with the cylinders to receive the spent gases which are forced out of the cylinders by the action of the said piston heads (92) thus completing the fourth cycle. The operation is now repeated and continues as already mentioned.

Figure 19 shows the completion of the exhausting movement, but during this said exhaust movement of the piston, cooling air is drawn into the crank side of the cylinders through the conducting pipes (49), ports (39¹) formed in the valve-drum (30), and auxiliary air inlets (37) in said valve-drums, (Figures 19, 5 and 8). By the return movement of the pistons toward the crank compartment this air is forced out of the cylinders into the conductors (49) where it may escape thru valve 48 Fig. 14 or it may be directed into aforesaid mixing chambers (39) where it is enriched by a mixture of combustible fluid through the medium of the carburetters (38) already described. (Figures 5 and 14). This compressed air is confined in the said chamber until it is inducted into the combustion chamber of the cylinders through the auxiliary passages (36) (Figures 20 and 21).

Figures 22 and 23 graphically illustrate the various movements and functions, in degrees of arc of the crank shaft, during the 4 strokes comprising a complete operation of each set of cylinders, their pistons and connections.

In Figure 22 it will be seen, by comparison with the other diagrams on the sheet, that the intake consumes an arc of approximately 180° beginning about 10° beyond dead-center line, indicated on the diagrams by the vertical dotted and dash line. The super-charge is then inducted through an arc equal, approximately, to 40° after which compression consumes the remaining arc of 130°.

This embraces the first half of a complete operation, continuing and referring to Figure 23 it is noted that ignition, beginning shortly before completion of compression, and expansion due to combustion, 150° of the arc and represents conversion to work.

The exhaust consumes an arc of 220°, after which the intake ports come into alignment again, and the operation as indicated is repeated.

The super charge of combustion elements may be employed as a means to give an engine functioning on the ordinary single induction principal and compression an overload capacity, without increasing the usual temperatures, pressures and strains. This is accomplished by regulating the time of the ignition of the combustion elements so that the maximum pressure of the burning elements will not be realized until the movement of the piston on its power stroke has increased the volume of the combustion chamber to such extent that it will offset the increase in pressure of the burning elements caused by the addition of the super charge combustion elements.

In Figures 9 and 10, there is shown a modified form of crank and crank beam connection. In this form the crank member rides in the bearing collar (94) suitably held within a split and floating annular housing (95) which is in turn held within the bushing formation (96) upon the crank beam (97). The said crank beam is made up of two sections held together by means of the bolts (98), and nuts (99), while a spacer (100) is provided to properly space the sections.

The said sections of the crank beam (97) are adapted to engage and slide upon blocks (101) having bearing surfaces (102) formed thereon. The said blocks (101) engage and hold securely, cross-bars (103) which are formed with a shank (104) to which are attached the piston rods (105). The said piston rods are formed with a ball end (106) engaging against a cooperating bearing surface (107) upon the said shank (104). A bolt (108), engaging through a block (109) upon the piston rod (105) and through the said shank (104), holds the mentioned members together by means of its nut (110). The contacting surfaces of the head of the bolt (108) and the block (109) are ball shaped as shown in Figure 9.

The housing (95) is formed with lugs (111) which engage in recesses (112) having proper clearance to afford the said housing (95) movement in a direction parallel to the axis of the said crank beam (97). The aforesaid ball joint connection of the piston rod to the cross bar provides flexibility and thus prevents binding at that point thereby relieving the piston operated means of an undue strain when the floating bearing or housing 95 moves out of alignment.

This modified construction is particularly applicable to a form of engine in which the cylinders are disposed in pairs directly opposite one another, and in which the two opposing cylinders have a common axis.

Such an arrangement is clearly shown in Figures 15 and 16 in which a sixteen cylinder engine is illustrated and in which various parts and members, although slightly differing in shape and arrangement, function and operate similarly to the corresponding parts shown in the other views and heretofore described. For this reason the parts have been designated by corresponding numerals having a dash prefix.

It is obvious that various other modifications may be embodied in this invention without departing from the spirit of same; it will therefore be understood that the invention is not limited to the particular construction shown.

What is claimed as new and desired to be secured by Letters Patent, is:—

1. In an internal combustion engine, a crank shaft having oppositely disposed cranks, pairs of parallel cylinders on opposite sides of said crank shaft and having their axes arranged in a plane transverse and perpendicular to the axis of the crank shaft, pistons in said cylinders, a connection between the pistons of each pair of cylinders and one of the cranks, and valve and ignition means for said cylinders.

2. In an internal combustion engine, a crank shaft having oppositely disposed cranks, pairs of parallel cylinders on opposite sides of said crank shaft and having their axes arranged in a plane transverse and perpendicular to the axis of the crank shaft, pistons in said cylinders, means to connect the pistons of each pair of cylinders together to hold said pistons to move in unison and in the same direction; connections between the last mentioned means and the crank shaft, and valve and ignition means for said cylinders.

3. In an internal combustion engine, a crank shaft having oppositely disposed cranks, pairs of parallel cylinders on opposite sides of said crank shaft and having their axes arranged in a plane transverse and perpendicular to the axis of the crank shaft, pistons in said cylinders, a connection between the pistons of each pair of cylinders and one of the cranks, and valve and ignition means for said cylinders constructed and arranged to effect substantially equal pressures in opposite directions on said crank shaft in all stages of operation.

4. In an internal combustion engine, a crank shaft having oppositely disposed cranks, pairs of parallel cylinders on opposite sides of said crank shaft and having their axes arranged in a plane transverse and perpendicular to the axis of the crank shaft, pistons in said cylinders, means to connect the pistons of each pair of cylinders together to hold said pistons to move in unison and in the same direction, connections between the last mentioned means and the crank shaft, and valve and ignition means for said cylinders, constructed and arranged to effect substantially equal pressures in opposite directions on said crank shaft in all stages of operation.

5. In an internal combustion engine, a crank shaft having oppositely disposed cranks, pairs of parallel cylinders on opposite sides of said crank shaft, pistons in said cylinders, a connection between the pistons of each pair and one of the cranks, a single valve and ignition means for the two cylinders of each pair and an operative connection between the crank shaft and the valve and ignition means.

6. In an internal combustion engine, a crank shaft having oppositely disposed cranks, pairs of parallel cylinders on opposite sides of said crank shaft, pistons in said cylinders, a connection between the pistons of each pair and one of the cranks, a single valve and ignition means for the two cylinders of each pair and an operative connection between the crank shaft and the valve and ignition means, said valve and ignition means being constructed and arranged to effect the control of the combustible fluids whereby to produce substantially equal pressures in opposite directions on opposite sides of the crank shaft in all stages of operation.

7. In an internal combustion engine, a crank shaft having oppositely disposed cranks, a pair of parallel cylinders on each side of said crank shaft, pistons in said cylinders, a connection between each pair of pistons and one crank of the shaft, means for supplying a normal charge of combustible fluid to said cylinders, other means for supplying a supercharge of combustible fluid to said cylinders, a single valve and ignition means for the two cylinders of the pair to control the disposition and ignition of the fluid charges therein, and an operative connection between the crank shaft and valve and ignition means.

8. In an internal combustion engine, a crank shaft having oppositely disposed cranks, pairs of parallel cylinders on opposite sides of said crank shafts, pistons in said cylinders, a connection between each pair of pistons and one crank of the shaft, means for supplying a normal charge of combustible fluid to said cylinders, other means for supplying a supercharge of combustible fluid to said cylinders, a single valve and ignition means for the two cylinders of each pair to control the disposition and ignition of the fluid charges therein, and an operative connection between the crank shaft and valve and ignition means, said valve and ignition means being constructed and arranged to effect the control of the combustible fluids whereby to produce substantially equal pressures in opposite directions on opposite sides of the crank shaft in all stages of operation.

9. In an internal combustion engine, a crank shaft having oppositely disposed cranks, pairs of parallel cylinders arranged transversely across said shaft on opposite sides thereof, pistons in said cylinders, piston rods rigidly connected to said pistons, connections between the beams and their respective piston rods, and rotatable and slidable connections between the beams and respective cranks.

10. In an internal combustion engine, a crank case, a cylinder having a closed end, attached to said crank case, a piston in said cylinder, the space between said piston and closed end forming an intake and compression chamber, valves controlling the passage of combustible into and out of said chamber, means controlled by one of said valves affording communication between the chamber and the opposite end of the cylinder, valve controlled passage of lubricant from the crank case to the chamber and passage of used lubricant from said chamber, and operating devices for said valves actuated from the crank shaft and arranged to alternate the admission and expulsion of combustible and lubricant to and from the chamber.

11. In an internal combustion engine, a pair of crank shafts arranged side by side, beams connecting the cranks of said shafts in pairs, cylinders adjacent the crank shafts, and having parallel axes arranged in a plane cutting the axes of the crank shafts and perpendicular thereto, a piston in each cylinder, and piston rods carried by said pistons and each having sliding connections with a respective beam.

12. In an internal combustion engine, a pair of crank shafts arranged side by side, beams connecting the cranks of said shafts in pairs, gearing connecting said crank shafts, said cylinders having parallel axes lying in a plane cutting the axes of the crank shafts and perpendicular thereto, cylinders adjacent the crank shafts, a piston in each cylinder, and piston rods carried by said pistons and each having sliding connections with a respective beam.

Signed at Elizabeth, in the county of Union and State of New Jersey, this 15th day of March A. D. 1919.

WALTER W. CONNERS.

Witnesses:
HAVEN J. BURNS,
MARY F. McCARTNEY.